United States Patent
Nagel et al.

(10) Patent No.: US 12,128,752 B2
(45) Date of Patent: Oct. 29, 2024

(54) AUTOMATED GUIDE DEVICE AND AUTOMATED GUIDED SYSTEM FOR TRANSPORTING OBJECTS, AND METHOD FOR OPERATING AN AUTOMATED GUIDE DEVICE AND AN AUTOMATED GUIDED SYSTEM FOR TRANSPORTING OBJECTS

(71) Applicants: IMS GEAR SE & CO. KGAA, Donaueschingen (DE); ANTRIMON (DEUTSCHLAND) GMBH, Aldingen (DE)

(72) Inventors: Benedikt Nagel, Brigachtal (DE); Carsten Belz, Oberndorf (DE); Egor Melnikov, Wurmlingen (DE); Fabian Gruler, Aixheim (DE); Johannes Stöhr, Villingen-Schwenningen (DE); Matthias Huber, Gutmadingen (DE); Michael Rosen, Bad Durrheim (DE); Robin Teichmann, Constance (DE); Wolfram Hofschulte, Bonndorf (DE); Yannik Abelmann, Tennenbronn-Schramberg (DE); Yvonne Fürderer, Furtwangen (DE); Simon Schwörer, Brigachtal (DE)

(73) Assignees: IMS GEAR SE & CO. KGAA, Donaueschingen (DE); ANTRIMON (DEUTSCHLAND) GMBH, Aldingen (DE)

( * ) Notice: Subject to any disclaimer, the term of this patent is extended or adjusted under 35 U.S.C. 154(b) by 302 days.

(21) Appl. No.: 17/772,618

(22) PCT Filed: Jul. 16, 2020

(86) PCT No.: PCT/EP2020/070220
§ 371 (c)(1),
(2) Date: Apr. 28, 2022

(87) PCT Pub. No.: WO2021/083563
PCT Pub. Date: May 6, 2021

(65) Prior Publication Data
US 2022/0371424 A1    Nov. 24, 2022

(30) Foreign Application Priority Data
Oct. 29, 2019  (EP) ..................... 19205972

(51) Int. Cl.
*B60K 1/04*     (2019.01)
*B60L 53/80*    (2019.01)
(Continued)

(52) U.S. Cl.
CPC ............... *B60K 1/04* (2013.01); *B60L 53/80* (2019.02); *B66F 9/063* (2013.01); *B66F 9/065* (2013.01);
(Continued)

(58) Field of Classification Search
CPC . B60K 1/04; B60L 53/80; B60L 50/60; B66F 9/063; B66F 9/065; B66F 9/0755; G05D 1/0276; G05D 1/0291
(Continued)

(56) References Cited

U.S. PATENT DOCUMENTS

5,180,023 A * 1/1993 Reimers .................. B62B 1/042
                                                    180/19.1
7,694,758 B1 * 4/2010 Hammonds ............ B62D 11/06
                                                    180/6.48
(Continued)

FOREIGN PATENT DOCUMENTS

CN    207384216 U      5/2018
DE    10229270 A1 *   1/2004   ............. A63B 55/61
(Continued)

OTHER PUBLICATIONS

Translation of DE10229270 accessed at www.espacenet.com on Apr. 18, 2024. (Year: 2004).*
(Continued)

*Primary Examiner* — James A Shriver, II
*Assistant Examiner* — Hilary L Johns
(74) *Attorney, Agent, or Firm* — Nath, Goldberg & Meyer; Jerald L. Meyer; Ilirian Durri (57) ABSTRACT

The present invention relates to an automated guide vehicle (10) for transporting objects (38) comprising a support structure (12) with an outer contour (14), a chassis (16) fastened to the support structure (12) having at least one first wheel (18) and one second wheel (20), wherein the first wheel (18) and the second wheel (20) are respectively rotatably mounted in the chassis (16) about a first axis of rotation (D1) and a second axis of rotation (D2), a drive unit (22), with which the first wheel (18) and the second wheel (20) can be driven independently from one another, a lifting mechanism (32) cooperating with the support structure (12) for lifting and lowering at least one support portion (39) which cooperates therewith to transport the objects, and a store (70) for electrical energy, which in plan view protrudes in portions beyond the outer contour (14) of the support structure (12), wherein the energy store (70) is movably fastened to the support structure (12).

13 Claims, 7 Drawing Sheets

(51) Int. Cl.
　　*B66F 9/06*　　　(2006.01)
　　*B66F 9/065*　　(2006.01)
　　*B66F 9/075*　　(2006.01)
　　*G05D 1/00*　　 (2006.01)

(52) U.S. Cl.
　　CPC ......... *B66F 9/0755* (2013.01); *G05D 1/0276* (2013.01); *G05D 1/0291* (2013.01)

(58) Field of Classification Search
　　USPC ...................................................... 180/65.1
　　See application file for complete search history.

(56) References Cited

U.S. PATENT DOCUMENTS

| | | | | |
|---|---|---|---|---|
| 2010/0219011 | A1* | 9/2010 | Shimoyama | B62D 37/04 180/218 |
| 2016/0056432 | A1* | 2/2016 | Searles | H01M 10/4257 429/100 |
| 2016/0297653 | A1 | 10/2016 | Herre et al. | |
| 2017/0144873 | A1* | 5/2017 | Colantonio | B66F 9/065 |
| 2019/0295591 | A1* | 9/2019 | Pajevic | B25J 5/007 |

FOREIGN PATENT DOCUMENTS

| | | | | |
|---|---|---|---|---|
| DE | 202013004209 | U1 | 7/2013 | |
| DE | 202014000755 | U1 * | 6/2015 | ............... B60G 3/20 |
| KR | 1020150139732 | A | 12/2015 | |
| KR | 20180079692 | A | 7/2018 | |

OTHER PUBLICATIONS

Translation of DE202014000755U1 accessed on Apr. 19, 2024 at www.espacenet.com (Year: 2015).*
Office Action issued Oct. 6, 2023, in parallel Chinese patent application No. 2020 8007 4879.8 with English translation.
Office action issued Nov. 30, 2023, in parallel Korean patent application 10-2022-7011627 with report letter in English from Korean associate.
Search report issued May 4, 2020, for corresponding application EP 19205972.3.

* cited by examiner

AUTOMATED GUIDE DEVICE AND AUTOMATED GUIDED SYSTEM FOR TRANSPORTING OBJECTS, AND METHOD FOR OPERATING AN AUTOMATED GUIDE DEVICE AND AN AUTOMATED GUIDED SYSTEM FOR TRANSPORTING OBJECTS

This is a National Phase Application filed under 35 U.S.C. 371 as a national stage of PCT/EP2020/070220, filed Jul. 16, 2020, an application claiming the benefit of European Application No. 19205972.3 filed Oct. 29, 2019, the content of each of which is hereby incorporated by reference in its entirety.

The present invention relates to an automated guide vehicle and an automated transport system for transporting objects. The invention, furthermore, relates to a method for operating an automated guide vehicle and an automated transport system for transporting objects.

Over the course of the advancing digitalization of industrial processes, the transport of objects is also increasingly automated. For this purpose, so-called automated guide devices and automated transport systems (ATS) are used, which are also referred to as Automated Guide Vehicles (AGV). A plurality of automated guide vehicles are combined and operated as a swarm in automated transport systems. Automated transport systems are, in particular, used in logistics and manufacturing where various objects, for example semi-finished goods and other components, need to be transported from a first location to a second location. In so doing, it is possible that, by way of example, trucks can be loaded and unloaded.

In many cases, the objects are transported with the help of load carriers, for example cases, crates or pallets. An automated transport system is known from DE 10 2013 017 062 A1, which has two conveyor skids which can be inserted into the elongated cavities of a pallet in a similar manner to the forks of a forklift. The conveyor skids have a lifting mechanism with which the pallet can be slightly lifted off the ground and then transported to the desired location where the pallet is once again lowered.

Since the conveyor skids have a significantly greater extension in the longitudinal direction than in the transverse direction, maneuverability is, in particular, limited in that there must be sufficient space in front of the pallet, such that the conveyor skids can be aligned with the cavities. The device shown in EP 2 765 101 A1 also has an extension similar to the previously mentioned conveyor skids, such that, here too, there is limited maneuverability.

A further automated transport system is described in DE 10 2013 101 561 A1 and DE 20 2014 104 780 U1, which system uses reference marks, which lay out the path along which the automated transport system can be moved. This results in limited flexibility since a use outside the reference marks is not possible. In addition, relocating the reference marks requires substantial effort.

The task of one embodiment of the present invention is to propose an automated guide vehicle for transporting objects which automated guide vehicle can readily be integrated into existing transport processes, provide good maneuverability and additional functions which are not yet available and which can be operated over a comparably long time period.

Moreover, the task of one configuration of the invention is to create an automated transport system with which a plurality of automated guide vehicles can be operated over a comparatively long period of time while providing additional functions.

This task is solved by the features of claims 1 and 11. Advantageous embodiments are the subject of the sub-claims.

One embodiment of the invention relates to an automated guide vehicle for transporting objects, comprising
  a support structure with an outer contour,
  a chassis fastened to the support structure, having at least one first wheel and one second wheel, wherein the first wheel and the second wheel are respectively rotatably mounted in the chassis about a first axis of rotation and a second axis of rotation,
  a drive unit with which the first wheel and the second wheel can be driven independently one from the other, and
  a store for electrical energy, which in plan view protrudes in portions beyond the outer contour of the support structure, wherein the energy store is movably fastened to the support structure.

The objects that can be transported with the automated guide vehicle are, in particular, load carriers such as pallets, cases or crates, on or within which the goods and merchandise are placed. However, it is also possible that other objects can be transported with the automated guide vehicle while using appropriate adapters, such as for example, baby carriages, hospital beds and trash cans.

The outer contour is to be understood as the outer edge of the support structure, wherein the outer edge of the support structure can also be formed by a housing.

Due to the fact that the first wheel and the second wheel can be driven independently from one another, the automated guide vehicle is capable of turning around in a very small radius or even on the spot, which significantly increases the maneuverability of the automated guide vehicle and the transported object when compared to known guide vehicles.

The top view relates to the intended use, whereby the first wheel and the second wheel roll on a base. As a consequence, in the top view, one looks along a rotational axis. Depending on the embodiment, the outer contour can be rotationally symmetrical to the rotational axis, such that no eccentric sections can, for example, strike the walls of the cavities of a pallet upon rotation of the automated guide vehicle about the rotational axis. The store for electrical energy, which is, for example, needed to drive the wheels and to operate the sensor, protrudes in sections beyond the outer contour of the support structure, such that the energy store forms an eccentric section. This allows the space enclosed by the energy store and its charge capacity to be increased. However, there is the danger that the energy store will strike the neighboring objects during rotation, for example, the already mentioned walls of the cavities of a pallet. The energy store is however rotatably fastened on the support structure, such that if, for example, it strikes the walls of the cavities of the pallet, the further rotation of the automated guide vehicle will not be interfered with. As a consequence, the charge capacity of the energy store can be increased in this embodiment, without the maneuverability of the automated guide vehicle being limited.

According to a further embodiment, in plan view, the outer contour of the support structure is substantially rotationally symmetrical about a rotational axis and the energy store is rotatably fastened about the rotational axis to the support structure. The first and second axes of rotation are typically substantially parallel to a base, upon which the first wheel and the second wheel roll. This base is, for example, the loading area of a truck or the ground surface of a working area. In the intended use of the automated guide vehicle, in particular when it rolls on the base, the rotational axis should be substantially perpendicular to the base.

A ring-shaped groove can be provided for the movable fastening of the energy store to the support structure in which groove the energy store can positively engage with a suitably designed projection. The rotation is not, in particular, impacted in the case where the automated guide vehicle is to be rotated on the spot and the energy store strikes a neighboring object. It is possible to design the groove in such a way that it completely surrounds the support structure and is self-contained. As a consequence, it is possible to rotate the guide vehicle without limitation in relation to the energy store, which is to say even beyond 360°.

According to a further embodiment, in the top view, the outer contour of the support structure is substantially rotationally symmetrical around a rotational axis, wherein the support portion and/or the first wheel and the second wheel are arranged within the outer contour or are flush with the outer contour. The first and second axes of rotation are typically substantially parallel to a base, upon which the first wheel and the second wheel roll. This base is, for example, the loading area of a truck or the ground surface of a working area. In the intended use of the automated guide vehicle, in particular when it rolls on the base, the rotational axis should be substantially perpendicular to the base. The outer contour is to be understood as the outer edge of the support structure, wherein the outer edge of the support structure can also be formed by a housing.

Due to the fact that the outer contour is rotationally symmetrical in relation to the rotational axis and the support portion and/or the first wheel and the second wheel are arranged within the outer contour, the automated guide vehicle according to this embodiment does not have any eccentric portions. If, for example, the automated guide vehicle is located in the elongated cavities of a pallet and is to be rotated on the spot, it is guaranteed that a rotation of 360° is possible without the automated guide vehicle striking the pallet with eccentric sections.

According to a further embodiment, the energy store is detachable fastened to the support structure. The detachable fastening of the energy store to the support structure makes it possible to simplify the charging process. In particular, a discharged energy store can be swapped out with a fully charged energy store within a short period of time. The discharged energy store can be charged up during the time in which the fully charged energy store guarantees the operation of the automated guide vehicle. The swapping out of a discharged energy store for a fully charged energy store can be automated, such that, on the one hand, the swap can occur in a timely manner, and, on the other hand, with only a minimal temporal interruption of operation and without the assistance of a user.

According to a further embodiment, the automated guide vehicle comprises a lifting mechanism cooperating with the support structure to lift or lower at least one support portion, which portion cooperates with the same for transporting the objects. In principle, it is possible to place the object to be transported on the automated guide vehicle, for example, by means of a crane or a forklift truck, to subsequently move the object to the desired location. In such a case, it is, however, necessary to lift the object to be transported in order to remove it from the ground surface. The automated guide vehicle can also be used for the movement of objects that have rollers, such as for example, hospital beds and trash bins. These objects must not necessarily be lifted in order to be able to move them.

It is, however, possible by means of the lifting mechanism, to drive the automated guide vehicle into a corresponding recess of the object to be transported, for example, in the already mentioned longitudinal cavities of the pallet, whilst the pallet is still standing on the ground surface. When the automated guide vehicle is in the desired position, the lifting mechanism is then activated, whereby the pallet is lifted from the ground surface. The spreading device is subsequently activated, so that the automated guide vehicle can align itself in relation to the pallet. In addition, the automated guide vehicle is frictionally connected with the pallet, such that a slippage of the pallet in relation to the automated guide vehicle can largely be avoided. This can, in particular, be relevant when the pallet is to be transported along an inclined base surface. It is, therefore, also possible, to transport objects, without the objects needing to previously be lifted and placed on the automated guide vehicle. Furthermore, it is also possible to transport objects that do not even have rollers or the like, and therefore cannot be pulled.

In a further developed embodiment, the guide vehicle can have a sensor unit for capturing the surroundings of the guide vehicle, wherein the sensor unit is arranged in a sensor section delimited by the outer contour and the first axis of rotation or the second axis of rotation, and the sensor unit being configured in such a way that it captures only the part of the surroundings on the side of the first axis of rotation or the second axis of rotation on which the sensor unit is arranged.

Automated guide vehicles of the prior art have sensor units that can capture the immediate surroundings. Obstacles can, for example, be identified and corresponding countermeasures can be initiated. Depending on the type of obstacle, it can be avoided or the automated guide vehicle can be stopped. Since automated guide vehicles pose considerable danger to the people found in the surrounding area, and in order to enable smooth operation, the surroundings must be monitored in a seamless manner. As a consequence, the sensor unit must be capable of capturing 360° of the surroundings. The sensor technology needed for this is comparatively complex.

In this embodiment, the sensor unit is arranged in such a way that it is capable of capturing a maximum of 180° of the surrounding. In particular, reverse travel is not necessary given the possibility to configure the outer contour to be rotationally symmetrical and such that the automated guide vehicle is capable to turn around more or less on the spot. It is, therefore, only necessary to capture 180° of the surroundings. The sensor unit is arranged in such a way that the surroundings lying in front of the travel direction of the automated guide vehicle are captured. As a result, the sensor unit can definitively be constructed more simply and the corresponding automated guide vehicle can be provided more cost-effectively.

By definition, the sensor section is intended to be the section of the automated guide vehicle between the axis of rotation and the outer contour. For the case in which the automated guide vehicle has a plurality of axes of rotation, the sensor section shall be the one that extends over the smallest surface perpendicular to the rotational axis or in the top view.

In turn, the plan view refers to the intended use, in which the first wheel and the second wheel roll on a support. In the top view, one consequently looks along the aforementioned rotational axis. Depending on the embodiment, the outer contour can be rotationally symmetrical to the rotational axis, such that no eccentric sections can, for example, strike the walls of the cavities of a pallet upon rotation of the automated guide vehicle about the rotational axis. The store for electrical energy, which is, for example, needed to drive the wheels and to operate the sensor, protrudes in sections beyond the outer contour of the support structure, such that the energy store forms an eccentric section. This allows the space enclosed by the energy store and its charge capacity to be increased. However, there is the danger that the energy store will strike the neighboring objects during rotation, for example, the already mentioned walls of the cavities of a pallet. The energy store is however rotatably fastened on the support structure, such that if, for example, it strikes the walls of the cavities of the pallet, the further rotation of the automated guide vehicle will not be interfered with. As a consequence, the charge capacity of the energy store can be increased in this embodiment, without the maneuverability of the automated guide vehicle being limited.

A further developed embodiment is characterized in that the energy store is arranged outside of the sensor section. As already mentioned, the energy store can be movably fastened to the support structure. In order to, however, prevent the energy store from being positioned where it interferes with the operation of the sensor unit, the movability can be limited. This can, for example, be done by ensuring that the aforementioned ring-shaped groove does not protrude into the sensor section. In this way, notwithstanding the movable fastening of the energy store to the support structure, the proper functioning of the sensor unit is guaranteed.

A further embodiment is characterized in that the guide vehicle has at least one support wheel and/or one bristle portion. In principle, the number of wheels which is mounted in the chassis, is freely selectable. For example, it is possible to provide three or four wheels, in such a way that the guide vehicle is not able to be tilted. However, on the one hand, the technical effort is kept low and on the other hand, the maneuverability is increased if only two wheels are provided. In this case, the automated guide vehicle can however be tilted, such that it rests with part of the support structure on the base and drags across the base. To prevent this tilting, it is possible to provide a support wheel and/or a bristle portion. The support wheel will differ from the wheels in that the support wheel is not driven, but, in particular, is rotatable about an axis of rotation that runs parallel to the rotational axis and can therefore steer together Several such support wheels can understandably also be provided.

The bristle portion can be provided with correspondingly loadable bristles. The provision of a bristle portion also has the effect of preventing tilting and dragging. Moreover, the bristles act as a broom and remove at least smaller obstacles such as dirt particles from the surroundings lying in front of the guide vehicle in the direction of travel. These obstacles, therefore, do not have a detrimental effect on the rolling of the wheels on the base.

According to a further embodiment, all wheels can be rotatably disposed about a common axis of rotation and the automated guide vehicle can have a self-stabilizing device. In this embodiment, the guide vehicle is rotatable about the common axis of rotation such that it can be tilted about it in the case of unequal loading. As a result, as already mentioned, the support structure can drag over the base. In this embodiment, the automated guide vehicle has a self-stabilizing device that may, for example, comprise a tilt sensor or a gyroscope. In the case that it is determined that the automated guide vehicle is rotating about the common axis of rotation and there is a danger that the support structure will come into contact with the base, stabilizing counter-measures can be taken to reduce the tilt of the automated guide vehicle to a non-critical level. This can, for example, be done by controlling the drive unit so that the wheels are rotated in such a way that a torque can be generated to counteract the tilting.

It is also possible to provide counterweights or balance shafts that can be shifted within the support structure depending on the tilt, whereby a torque can be generated that likewise counteracts the tilting.

In a further developed embodiment, the guide vehicle can have a signal generator for outputting an indication signal. The indication signal can, in particular, be output in an optical and/or acoustic form. The indication signal can be output in a variety of cases, for example, if the automated guide vehicle is defective, an unexpected obstacle is detected that cannot be overcome, or if it is determined that the object to be transported is too heavy and as a result the automated guide vehicle would be overloaded.

In a further developed embodiment, the guide vehicle may have a carrying handle for gripping the guide vehicle. Depending on its configuration, the guide vehicle can weigh less than 10 kg, so that it can be carried by a user, whereby the guide vehicle can flexibly be transported from one location to another, without the guide vehicle needing to travel the way on its own. Carrying is facilitated by the carrying handle.

One configuration of the invention relates to a method for operating an automated guide vehicle according to any one of the previously presented embodiments, comprising the following steps:
  Capture as regards selectable properties of the surroundings of the guide vehicle by means of a sensor unit, and
  Lifting or lowering of the support portions by means of the lifting mechanism depending on the detected properties of the surroundings.

One of the selectable properties can be the evenness of the base upon which the guide vehicle rolls. In the case in which the sensor unit detects unevenness, for example, in the form of waviness of the ground surface, which could lead to the transported objects to slip or fall off of the guide vehicle, the support portion can correspondingly be lifted or lowered. In this way, the impacts and vibrations affecting the transported objects are kept to a minimum and the objects are protected.

In a further configuration, the method comprises the following steps:
  Definition of a loading area that is to be loaded with a plurality of objects by means of the guide vehicle,
  Transport of a first object to the loading area,
  Determination of the first force acting on the support portion by means of the force measuring device,
  Depositing of the first object at a first position of the loading area,
  Transport of a second object onto the loading area,
  Determination of the second force acting on the support portion by means of the force measuring device, and
  Depositing of the second object at a second position of the loading area, wherein the second position is selected as a function of the first force and the second force in such a way that the loading area is loaded in a uniform way.

As mentioned, the guide vehicle can be configured in such a way that it can determine the weight of the transported object(s). If a loading area, for example the loading area of a truck, is to be loaded, the guide vehicle can be operated in such a way that the loading area is loaded with the weight being distributed as uniformly as possible. For this purpose, the positions where the objects are deposited on the loading area are selected as a function of the weight of the concerned objects. A loading with the weight being loaded as uniformly as possible contributes to the road safety of the truck concerned and, in particular, reduces the risk of skidding. This also applies in a similar way to the loading of other means of transport such as ships and aircraft.

A further developed configuration of the method provides the following step:

Modifying the first position and/or the second position in order to equalize weight distribution of the load of the loading area.

Since the weight of the objects which are to be deposited on the loading area are not necessarily known in advance, it can be possible to modify the previously selected positions in order to equalize the weight distribution of the load of the loading area. The method according to this configuration can, for example, be carried out in such a way that the loading area is initially loaded to such an extent that all objects which are, for example, to be transported with the truck are deposited on its loading area. The automated guide vehicle thereby stores the position and the weight of the objects that are deposited on the loading area. Once loading is complete, the automated guide vehicle changes the positions of the corresponding objects within the loading area in such a way that the weight distribution is equalized as much as possible if this were to be necessary.

According to a further developed configuration, the method comprises the following steps:

Definition of a maximum load for the loading area, and
Outputting of an indication signal by means of the signal generators, if the defined maximum load is reached or exceeded.

In this configuration of the method, the guide vehicle outputs an indication signal, if the maximum load is reached or exceeded. Alternatively or additionally, the guide vehicle can suspend the further loading of the loading area. Overloading of the loading area is thereby prevented.

One configuration of the invention relates to an automated transport system, comprising a plurality of automated guide vehicles according to any one of the preceding embodiments,
a control unit for controlling or regulating the automated guide vehicles, and
a communication device, with which information can be exchanged between the control unit and the automated guide vehicles.

The automated transport system comprises a plurality of automated guide vehicles, wherein the number may be selected at will. The minimum number should be two. A number of three or four guide vehicles will be the most appropriate depending on the objects that are to be transported. The transport system can however also comprise multiple sub-groups of, for example, four guide vehicles, wherein the number of the guide vehicles of the sub-groups must not necessarily be the same.

In order to be able to transport objects with a plurality of automated guide vehicles, these guide vehicles must be coordinated, which is the purpose of the control unit. In addition, information must be exchanged between the control unit and the automated guide vehicles, in order to be able to implement the coordination, which is the purpose of the communication device. The communication device can use a WLAN-network or the like. For this purpose, each of the transport devices and the control unit has a transmitter-receiver unit. This transmitter-receiver unit can also be used in the manner of a relay station and operated as a repeater, in order to maintain the stability of the WLAN-network. In particular, in the case where some of the guide vehicles are located behind goods, the WLAN-network may not be sufficient. The repeater function also strengthens the WLAN-network in areas with a weak WLAN-network.

The tasks that the automated transport system is required to perform can be defined in the control unit. In particular, the objects which are to be transported can be identified. In addition, the current location and the destination location of the objects to be transported can be defined.

In a further configuration, one of the automated guide vehicles can be configured as a master and the remainder of the automated guide vehicles can be configured as slaves, the master can have a master sensor for capturing the surroundings of the master, and the master can transmit the information relating to the surroundings of the masters to the control unit and/or to the slaves.

The master differs from the slaves in that only the master has the master sensor unit. The slaves either have no sensor unit whatsoever or else only a much simpler sensor unit. The master sensor unit is constructed in such a way that it can capture not only the immediate surroundings of the master itself, but also the surroundings of all the slaves. In this respect, the master sensor unit must have a correspondingly powerful design. Due to the fact that the slaves do not require any sensor unit or only a much simpler sensor unit, the expense relating to the sensor units used can be reduced. The more slaves used, the greater advantage that can be achieved. The master can also be equipped with a particular powerful communication device, in order to guarantee a sufficient network coverage, for example, within the working area. The master can be positioned in such a way that the network, for example the WLAN-network, can be strengthened in a particularly effective manner, such that the information exchange with the slaves is guaranteed. In so doing, the master can constantly adjust its position to the strength of the network and to the position of the slaves.

A further configuration is characterized in that each of the guide vehicles has a sensor unit for capturing the surroundings of the guide vehicle, wherein
the sensor unit is arranged in a sensor section delimited by the outer contour and the first axis of rotation or the second axis of rotation, and
the sensor unit is designed to capture only the part of the surroundings that is on the side of the first axis of rotation or of the second axis of rotation, on which the sensor unit is arranged, wherein
at least a first of the sensor units is oriented in a first direction and at least a second of the sensor units is oriented in a second direction.

In this configuration, all of the automated guide vehicles that are combined to form a transport system have the same sensor units. If, for example, two guide vehicles are combined to form a transport system, the sensor unit of the first guide vehicle can be oriented for-ward and the sensor unit of the second guide vehicle can be oriented rearward, in the direction of travel. In this respect, the surroundings of the automated transport system can be monitored to a sufficient extent without requiring the use of particularly powerful sensor units.

An implementation of the present invention relates to a method for operating an automated transport system according to the preceding configurations, comprising the following steps:

Determination of the force acting on the respective support portions of the guide vehicle by means of the force measuring devices,
Transmission of the forces determined to the control unit by means of the communication device, Comparison of the forces determined by means of the control unit, and Lifting or lowering, at the instigation of the control unit, of one or more of the support portions by means of the lifting mechanisms depending on the comparison.

This implementation of the invention is only used when an object is lifted by multiple guide vehicles and transported. If it is determined that the force acting on a support portion of a first guide vehicle deviates significantly from the force that acts on the support portion of a second or third guide vehicle, this can be taken as an indication that the weight of the object is not uniformly distributed among the involved guide vehicles. The support portion of the first guide vehicle is lowered, whereby excessive loads on one of the guide vehicles are avoided. The wear of the guide vehicles used also becomes more uniform.

A variant of the present invention relates to a method for operating an automated transport system according to one of the preceding configurations, comprising the following steps:

Transport on an object with at least two guide vehicles,

Detection of the surrounding of at least one guide vehicle by means of a sensor unit as regards selectable properties, and Lifting or lowering of the support portions by means of the lifting mechanisms as a function of the detected properties of the surroundings.

As already mentioned, one of the selectable properties can be the evenness of the base upon which the guide vehicles roll. If unevenness such as a waviness of the ground surface is detected, which could lead to the transported object touching down on the base between the two guide vehicles, then the support portions are lifted in such a way to prevent the object from touching down. Dysfunctions in the operating sequence are thereby prevented.

Exemplary embodiments of the invention are explained in more detail below with reference to the accompanying drawings. Wherein

Figure 1A:
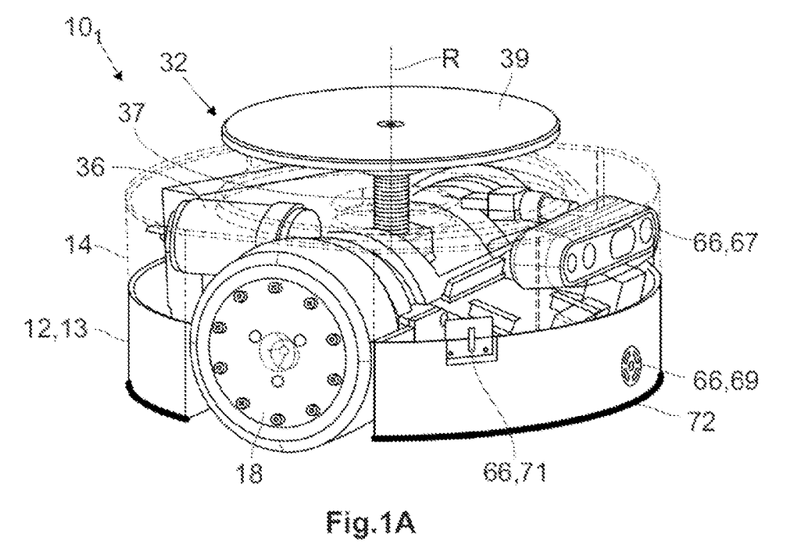
FIG. 1A shows a perspective view of a first embodiment example of a guide vehicle for transporting objects, according to invention.
Figure 1B:
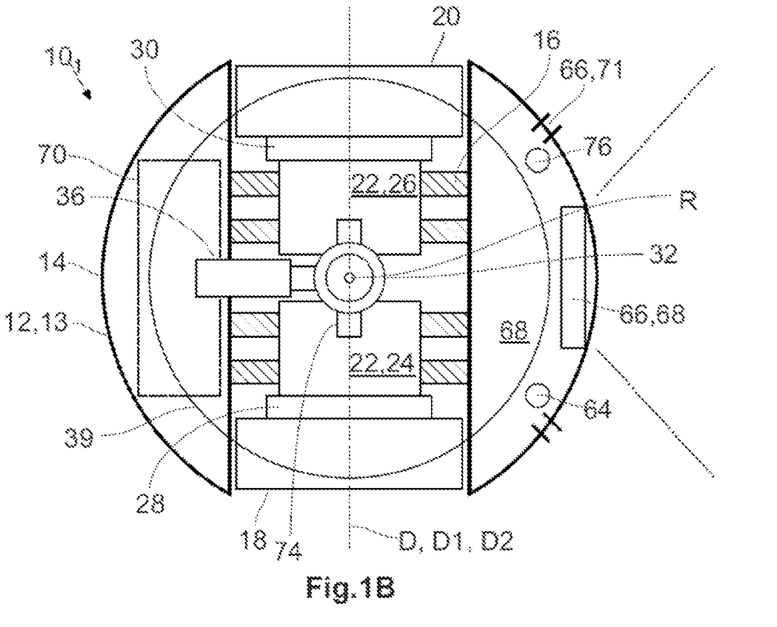
FIG. 1B shows a principal top view, not to scale, of the guide vehicle embodiment example shown in FIG. 1A.

FIG. 1A and FIG. 1B show a first embodiment example of a first guide vehicle $10_1$ according to the present invention. FIG. 1A shows the guide vehicle $10_1$ by means of a perspective representation, whereas FIG. 1B shows a top view on the guide vehicle $10_1$ shown in FIG. 1A, wherein FIG. 1B is not to scale and is only of principal nature.

The guide vehicle $10_1$ has a support structure 12, which in the present embodiment example is formed of a housing 13, which has an outer contour 14. The outer contour 14 thereby identifies the outer surfaces and edges of the support structure 12 or of the housing 13. A chassis 16 is fastened to the support structure 12, in which a first wheel 18 and a second wheel 20 are rotatably mounted about a first axis of rotation D1 and about a second axis of rotation D2. In the illustrated embodiment example, the first axis of rotation D1 and the second axis of rotation D2 coincide so that there is a common axis of rotation D.

The guide vehicle $10_1$ moreover comprises a drive unit 22, which is also fastened to the support structure 12. In this case, the drive unit 22 has a first drive motor 24 and a second drive motor 26, wherein the first drive motor 24 is disposed adjacent to the first wheel 18 and the second drive motor 26 is disposed adjacent to the second wheel 20. The first drive motor 24 is connected to the first wheel 18 via a first gear 28 and the second drive motor 26 is connected to the second wheel 20 via a second gear 30, such that the rotational motion provided by the first drive motor 24 and by the second drive motor 26 can be directly transmitted to the first wheel 18 or alternatively the second wheel 20. The first drive motor 24 can be operated independently of the second drive motor 26, such that the first wheel 18 and the second wheel 20 can also be driven in different directions and with different speeds, whereby the guide vehicle $10_1$ can be rotated.

Figure 3A:
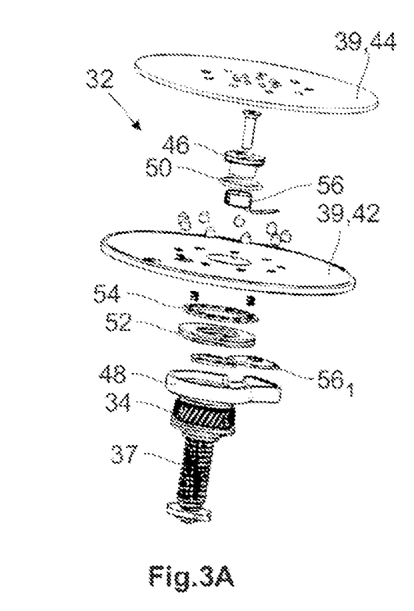
FIG. 3A shows an isolated and perspective exploded view of a lifting mechanism of the guide vehicle.

The guide vehicle $10_1$ moreover comprises a lifting mechanism 32, which is separately shown in FIG. 3A. The lifting mechanism 32 is provided with a spindle nut 34, which can be rotated about the rotational axis R by means of a third drive motor 36. The rotational axis R runs perpendicular to the common axis of rotation D and is vertical in its intended use. The spindle nut 34 cooperates with a non-rotatable spindle 37, which in turn is connected with a support portion 39, which in the first embodiment example of the guide vehicle $10_1$ is designed in the manner of a turntable, which is rotatable in reference to the housing 13. If the spindle nut 34 is rotated around the rotational axis R by means of the third drive motor 36, then the spindle 37 and the support portion 39 connected thereto are moved along the rotational axis R. With reference to the intended use of the guide vehicle $10_1$, which exists when the first wheel 18 and the second wheel 20 roll on a base that is not depicted in FIG. 1A and FIG. 1B, the support portion 39 is then either lifted or lowered depending on the rotational direction of the third drive motor 36. The guide vehicle $10_1$ is driven into a cavity of the pallet 40 to transport an object 38, for example a pallet 40 (see FIG. 5) and subsequently the lifting mechanism 32 is activated in such a way that the support portion 39 is lifted. As a consequence, the support portion 39 is brought into contact with the pallet 40, which thereinafter is lifted such that it no longer has any contact with the base. The pallet 40 can subsequently be moved to the desired location with the guide vehicle $10_1$.

Referring to FIG. 3A it can be seen that the support portion 39 of the lifting mechanism 32 has a plate 42 and a nop mat 44 connected with plate 42. The nop mat 44 can, for example, be bonded with the plate 42. The plate 42 is connected by means of an adapter sleeve 46 with the spindle 37. The adapter sleeve 46 contemporaneously fastens an open plate housing 48 that is open towards the plate 42 with the spindle 37. An O-ring 50 is inserted in a circumferential groove of the adapter sleeve 46 and seals the adapter sleeve 46 with respect to plate 42 ab. An axial roller bearing 52 is disposed in the plate housing 48 so that the support portion 39 can rotate in relation to the plate housing 48 and the remaining guide vehicle $10_1$. A rubber ring 54 is disposed between the axial roller bearing 52 and the plate 42. The rubber ring 54 allows for tilting movements between the plate 42 and the axial roller bearing 52, which movements are caused by an uneven distribution of the load of the support portions 39.

Figure 3B:
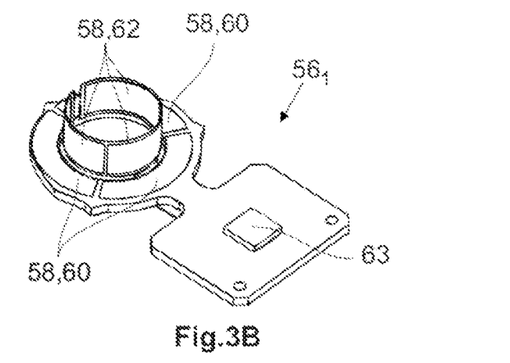
FIG. 3B shows an isolated representation of a force measuring device according to a first embodiment example which is integrated into the lifting mechanism.

Furthermore, according to a first embodiment, a force measuring device $56_1$ is arranged in the plate housing 48, which is separately represented in FIG. 3B. In the first embodiment, the force measuring device $56_1$ comprises a total of six capacitive force sensors 58, which can be divided in a first group 60 and a second group 62, each group having three force sensors 58. As regards the intended use of the guide vehicle $10_1$, the main surfaces of the force sensors 58 of the first group 60 lie in a horizontal plane, whereas the main surfaces of the force sensors 58 of the second group 62 are oriented perpendicular to the main surfaces of the force sensors 58 of the first group 60. The force sensors 58 of the first group 60 are designed with a circular ring sector shape, whereas the force sensors of the second group 62 are designed with a cylindrical sector shape. In the intended use of the guide vehicle $10_1$, the main surfaces of the force sensors 58 of the second group 62 lie in a vertical plane. Resistive force sensors, strain gauges or printed electronics can also be used instead of the capacitive force sensors 58.

Figure 3C:
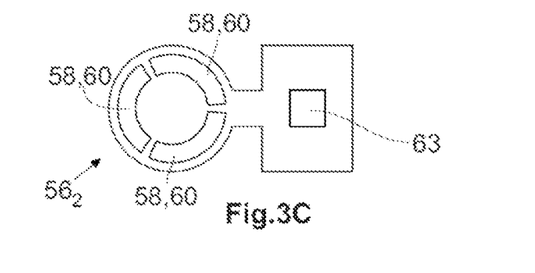
FIG. 3C shows an isolated representation of a force measuring device according to a second embodiment example which is integrated into the lifting mechanism.

FIG. 3C shows a second embodiment example of the force measuring device $56_2$, which essentially differs from the force measuring device $56_1$ according to the first embodiment example in that it only has three capacitive force sensors 58, which can be assigned to the first group 60.

In both cases, it is possible to measure horizontally acting forces and vertically acting forces. In addition, depending on how the force sensors 58 are mechanically mounted, tilting, rotational and sliding movements can be measured.

In the first embodiment example of the force measuring device $56_1$, the force sensors 58 of the first group 60 are used to determine vertically acting forces. The force sensors 58 of the second group 62 are used to determine horizontally acting forces. Due to the allocation of the force sensors 58 in the first group 60 and the second group 62, the different load cases can be distinguished from one another more accurately than is the case with the second embodiment example of the force measuring device $56_2$. Since, in principal, the various load cases can better be described as the number of force sensors 58 increases, a push to increase the number of force sensors 58 is made. However, this increases the space requirement. The arrangement of the force sensors 58 of the first group 60 perpendicular to the force sensors 58 of the second group 62, on the one hand, increases the precision with which the load cases can be described, and on the other hand can keep the needed space within acceptable bounds.

The force sensors 58 cooperate with an evaluation unit 63, such that the forces acting on the support portion 39 can be determined. In addition, the evaluation unit 63 can be used to determine how the forces are distributed over the support portion 39. Due to the degrees of freedom provided by the mounting of the support portions 39 in the lifting mechanism 32, certain load cases that are to be determined, such as tilting, can be specified. In addition, the loads that can be determined depend on the arrangement of the force sensors 58 relative to the support portion 39.

The information relating to the magnitude and distribution of the forces acting on the support portion 39 can be used in a variety of ways, which will be discussed in more detail here below. At this point, it should only be noted that overloading of the guide vehicle $10_1$ can be prevented. If the force acting on the support portion 39 exceeds a certain level, the lifting of the support portion 39 can be interrupted and an appropriate indication signal can be output by means of a signal generator 64 (see FIG. 1B). The indication signal can, for example, be output in optical and/or acoustic form.

Referring to FIG. 1A and FIG. 1B, the guide vehicle $10_1$ comprises a sensor unit 66, with which the surroundings of the guide vehicle $10_1$ can be captured. In particular, it is possible to detect obstacles and the nature of the ground surface on which the wheels roll. The sensor unit 66 can comprise cameras 67, ultrasonic sensors 69, laser-based sensors 71 or radar-based sensors or the like, with which the surroundings can be captured with sufficient precision even under different conditions. The sensor unit 66 is arranged in a sensor section 68, which is delimited by the outer contour 14 and by the common axis of rotation D or a plane passing through the common axis of rotation D and the rotational axis R. According to this definition, the transport device $10_1$ has two such sensor sections 68, however, the sensor unit 66 is only arranged in one of these sensor sections 68. This arrangement results in the sensor unit 66 only being able to capture the part of the surroundings which is on the side where the sensor unit 66 is located, on the side of the common axis of rotation D or of the plane running through it.

In addition, the guide vehicle $10_1$ is equipped with an electric energy store 70 so that the relevant components can be supplied with electrical energy.

As can be recognized, in particular, from FIG. 1B, the outer contour 14 is at least in sections rotationally symmetrical to the rotational axis R. Moreover, the support portion 39 and the first wheel 18 and the second wheel 20 are, in particular, arranged within the outer contour 14. No components, therefore, protrude radially beyond the outer contour 14. This results in the effect that when the guide vehicle $10_1$ is rotated on the spot, which can be done by a corresponding actuation of the first wheel 18 and the second wheel 20, there are no eccentric sections present which could impact adjacent objects and interfere with the rotation as long as the adjacent objects are at a distance corresponding to at least the radius of the outer contour 14 about the axis of rotation R.

It can be seen from FIG. 1A that a bristle portion 72 is disposed at the lower edge of the housing 13, which bristle portion is made up of a plurality of bristles which are not explicitly recognizable here. As mentioned, the first wheel 18 and the second wheel 20 are disposed on a common axis of rotation D. As a consequence, the guide vehicle $10_1$ can tilt about the common axis of rotation D such that the housing 13 rests on the base on one side of the common axis of rotation D and then, upon movement of the guide vehicle $10_1$, drags along the base. This dragging is prevented with the bristle portion 72, which also has a stabilizing effect on the guide vehicle $10_1$. The bristle portion 72, moreover, has the effect of a broom, such that at least smaller particles are removed and cannot negatively impact the rolling of the wheels 18, 20 on the base.

To stabilize the guide vehicle $10_1$ about the common axis of rotation D, it is alternatively possible to also use one or more support wheels (not shown).

In the illustrated embodiment example, the guide vehicle $10_1$ is moreover equipped with a self-stabilizing device 74 (FIG. 1B) that can detect and counteract the inclination and the change in inclination of the guide vehicle $10_1$ about the common axis of rotation D. The self-stabilizing device 74 can, for example, have a gyroscope or a tilt sensor. If the self-stabilizing device 74 determines that the inclination about the common axis of rotation D exceeds a critical level, it is possible for the self-stabilizing device 74 to initiate countermeasures. The countermeasures can, for example, consist of a targeted acceleration or deceleration of the first wheel 18 and/or of the second wheel 20. Alternatively, a balance shaft, that is not illustrated here, can be actuated or weights, that are also not illustrated, can be moved around. All measures serve to generate a torque acting against the inclination about the axis of rotation D within the guide vehicle $10_1$ in order to once again reduce the inclination below the critical level. It should be noted that the self-stabilizing device 74 can only be used when no objects are being transported with the guide vehicle $10_1$.

The guide vehicle $10_1$ is moreover equipped with a communication device 76, with which the guide vehicle $10_1$ can exchange information with other communication partners, which will be discussed in more detail later.

Figure 2:
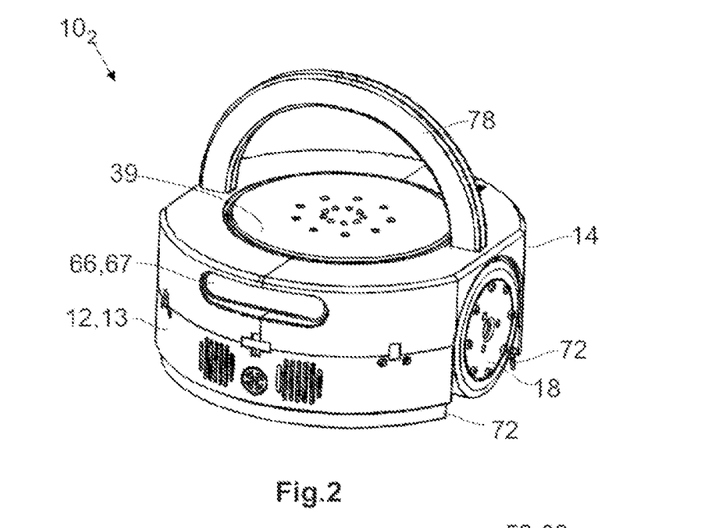
FIG. 2 shows a perspective view of a second embodiment example of the guide vehicle according to the invention.

FIG. 2 shows a perspective view of a second embodiment example of the guide vehicle $10_2$ according to the invention. The guide vehicle $10_2$ according to the second embodiment example is largely constructed in the same way as the guide vehicle $10_1$ according to the first embodiment example. The guide vehicle $10_2$ moreover has a carrying handle 78, which is rotatably fastened to the support structure 12. As a result, the guide vehicle $10_1$ can be gripped by the carrying handle 78 in the style of a pail and transported.

Figure 4:
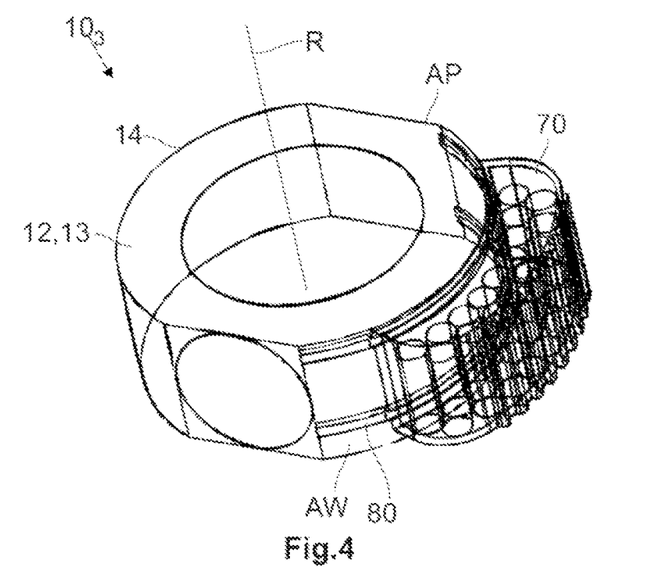
FIG. 4 shows a principal representation of a part of a support structure of the guide vehicle according to a third embodiment example, to which an energy store is movably fastened to the support structure.

FIG. 4 shows a part of a support structure 12 of the guide vehicle $10_3$ according to a third embodiment example on the basis of a principal and perspective representation, wherein the support structure 12 is designed as a housing 13. Two circular ring sector-shaped grooves 80 are arranged on one of the two curved outer surfaces AW of the housing 13, in which an electric energy store 70 positively engages and can be detachably connected to the housing 13. In this embodiment example, the energy store 70 is therefore arranged outside the housing 13 in the manner of a backpack and forms an eccentric section. The energy store 70 can be moved within the two grooves 80, rotating about the rotational axis R. The guide vehicle $10_1$ can therefore be moved on the spot within certain limitations, in spaces which are only minimally wider than the housing 13 at the two planar outer surfaces AP. Such spaces can be the cavities of pallets 40. The energy store 70 comes into contact with the walls of the pallet 40 during rotation and is rotated about the rotational axis R of the guide vehicle $10_1$ due to the rotational movement of the guide vehicle $10_1$ along the grooves 80. The energy store 70 does not further impede the rotation of the guide vehicle $10_1$.

Figure 5:
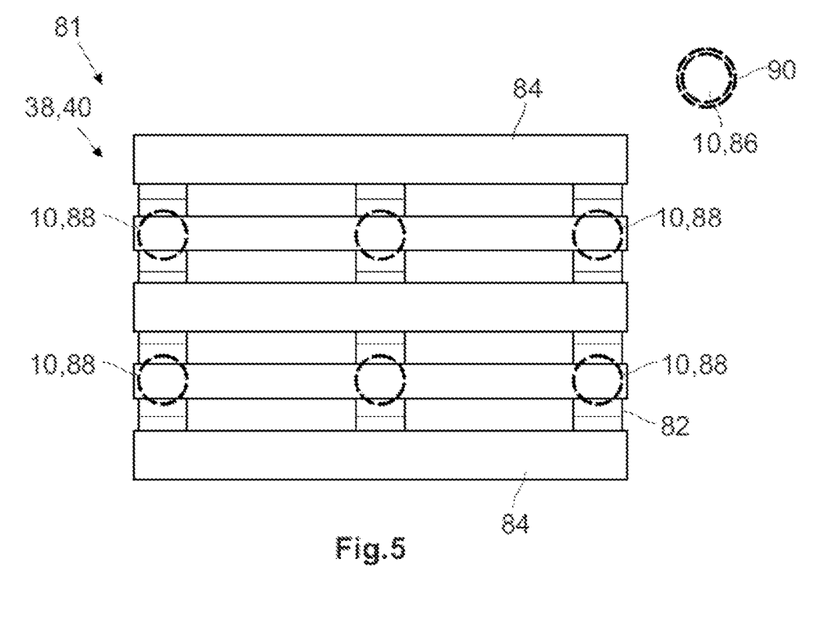
FIG. 5 shows a top view of an object that is transported by a transport system.

FIG. 5 shows a top view of an object 38 that can be transported with a transport system 81 according to the present invention. The object 38 is designed as a pallet 40 in FIG. 5, upon which objects not shown in more detail, such as cases or the like, can be placed. The pallet 40 shown has three cross-pieces 82 to which a total of five planks 84 are nailed. Two recesses which are not visible in FIG. 5 are arranged in each cross-piece 82, each of which is aligned with the recesses of the adjacent cross-pieces 82.

The transport system 81 comprises a total of seven guide vehicles 10, which are described in FIG. 1A and FIG. 1B and which are only represented in principle in FIG. 5. Six of the guide vehicles 10 are respectively driven into one of the recesses of the cross-pieces 82. The lifting mechanism 32 is then lifted so that the pallet 40 can be moved away from the base and subsequently be transported to the desired location. As is also recognizable from FIG. 5, a seventh guide vehicle $10_1$ is not inserted into the recesses of the pallet 40. The seventh guide vehicle $10_1$ is configured as a so-called master 86, whereas the remaining six guide vehicles 10 are configured as slaves 88. The master 86 is used in particular for capturing the surroundings, since it is positioned beyond the pallet 40 and can therefore better capture the surroundings in comparison to the slaves 88. The master 86 can transmit commands to the slaves 88 making use of the communication device 76, in particular relating to obstacles.

The master 86 accompanies the slaves 88 until the pallet 40 has been transported to the desired location. Then, the lifting mechanism 32 is accordingly activated, such that the pallet 40 is once again placed on the base. Thereinafter the slaves 88 are then driven out of the pallet 40 and can be used for the transport of a further object. The seven guide vehicles 10 can be constructed in the same manner. It is however also possible to provide the master 86 with a particularly powerful master sensor unit 90 so that the surroundings can be captured in a particularly extensive manner.

In the event in which the guide vehicles 10 are constructed in the same manner, each of the guide vehicles 10 can be defined as a master 86 or a slave 88. The guide vehicles 10 can be used in different ways. As mentioned, the master 86 is used to capture the surroundings of the pallet 40 as extensively as possible. For this purpose, the sensor unit 66 requires greater than average electrical energy. Due to the possibility of also being able to use one of the other guide vehicles 10 as a master 86, the energy store 70 of one guide vehicle $10_1$ is prevented from being discharged faster than the energy stores of the remaining guide vehicles 10. All of the guide vehicles 10 are also equally loaded down, which prevents one or many of the guide vehicles 10 wearing out faster and requiring maintenance sooner than others. Another one of the guide vehicles 10 can be used as master 86 to transport the further object 38.

Figure 6A:
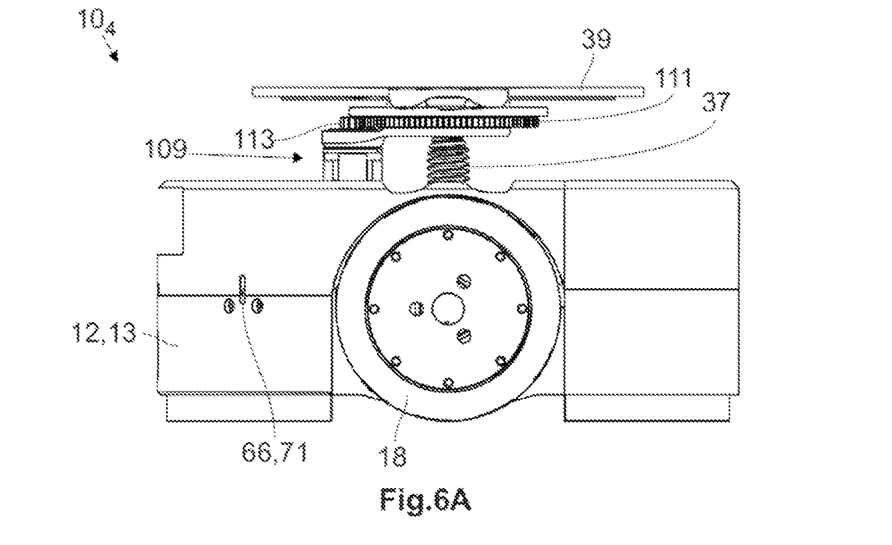
FIG. 6A shows a side view of a third embodiment example of the guide vehicle according to the invention which has a spreading device.
Figure 6B:
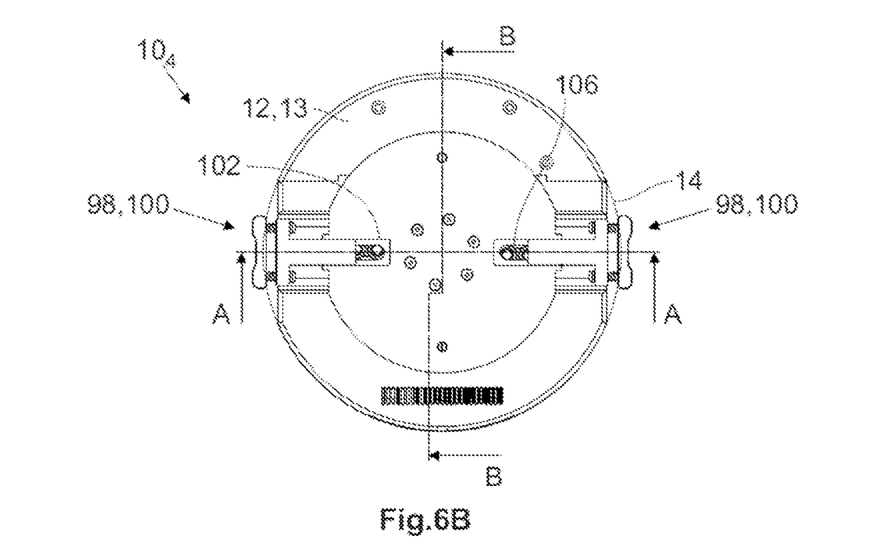
FIG. 6B shows a top view of the third embodiment example of the guide vehicle according to the invention shown in FIG. 6A.
Figure 6C:
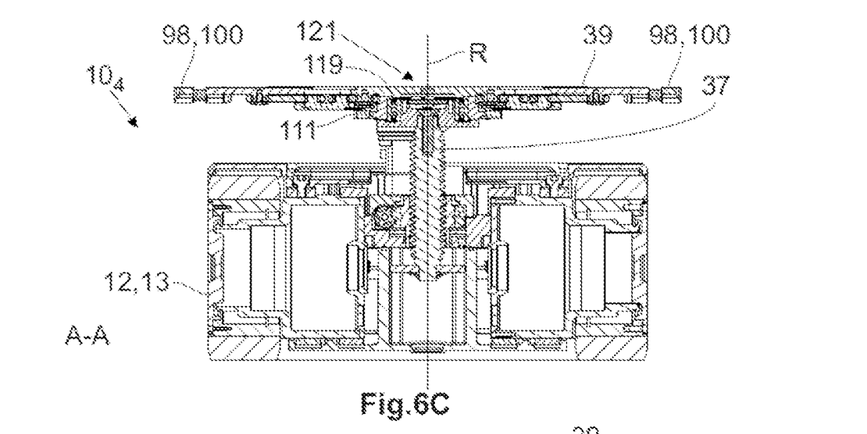
FIG. 6C shows a cross-sectional representation through the third embodiment example of the guide vehicle along the sectional plane A-A of FIG. 6B.
Figure 6D:
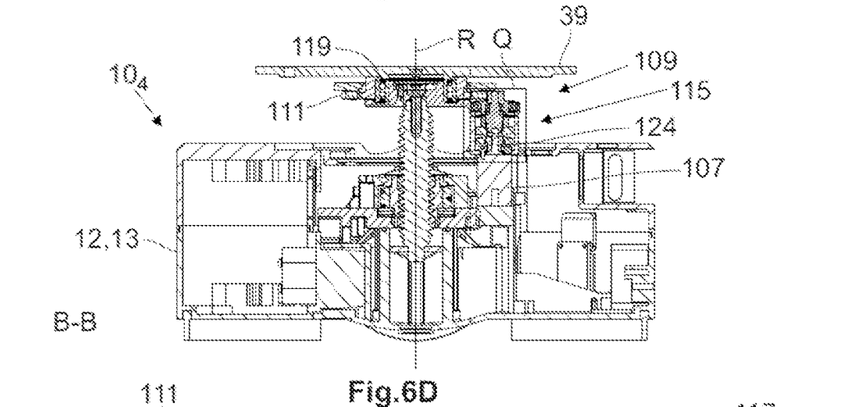
FIG. 6D shows a cross-sectional representation through the third embodiment example of the guide vehicle along the sectional plane B-B of FIG. 6B.
Figure 6E:
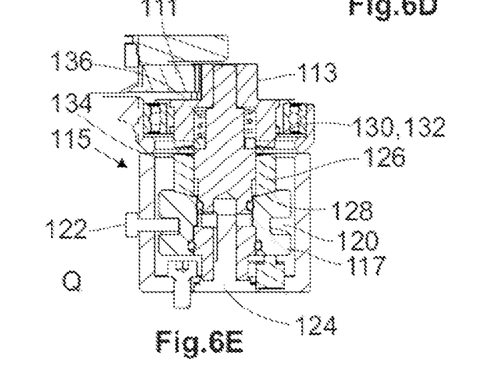
FIG. 6E shows an enlarged representation of the section Q marked in FIG. 6D.

FIG. 6A shows a fourth embodiment example of the guide vehicle $10_4$ according to the proposal by means of a side view and in FIG. 6B by means of a top view. FIG. 6C to FIG. 6E show a cross-sectional representation of a fourth embodiment example of the guide vehicle $10_4$ according to the proposal. The basic construction of the guide vehicle $10_4$ according to the fourth embodiment example largely corresponds to that of the previously described embodiment examples, so that only differences will be discussed hereinafter.

The guide vehicle $10_4$ according to the fourth embodiment example comprises a spreading device 98, which in the fourth embodiment example of the guide vehicle $10_4$ comprises two spreading arms 100, which spreading arms are adjustable between a first position and a second position by means of an adjustment unit 106. Both of the spreading arms 100 are represented in a second position in FIG. 6B, in which position the spreading arms 100 protrude beyond the outer contour 14 of the support structure 12. In the first position that is not shown, the spreading arms 100 are located within the outer contour 14, so that there are no eccentric portions that could come into contact with adjacently arranged objects 38 and thereby impede rotation when the guide vehicle $10_4$ is rotated in place. The spreading arms 100 are slidably mounted in guide ways 102, wherein the guide ways 102 are formed by grooves disposed in the support portion 39. The guide ways 102 extend radially outward from the center of the guide vehicle $10_4$ so that the spreading arms 100 can be moved in a radial direction.

On top of the adjustment unit 106, the spreading device 98 comprises a further drive unit 107 for moving the spreading arms 100 between the first and the second position, which drive unit will be described in more detail below with particular reference to FIG. 6C to FIG. 6E. The adjustment unit 106 and the further drive unit 107 cooperate using a drive train 109. The drive train 109 extends eccentrically to the axis of rotation R and comprises a first cog 111 and a second cog 113, which are in meshing engagement with one another which can, in particular, be seen in FIG. 6A. The first cog 111 is connected to the support portion 39 in a rotationally fixed manner. The rotational movement of the further drive unit 107 can thereby be transmitted to the adjusting unit 106. The spreading arms 100 can be moved between the first position and the second position with the rotary movement. The mechanisms used for this will be discussed below in more detail.

As mentioned here above, the spindle 37 is mounted in a rotationally fixed manner in the support structure 12. In order to be able to move the support portion 39 and consequently also the spreading device 98 relative to the housing 13, a corresponding bearing unit 119 is provided. An angle sensor 121 is provided to determine the rotational position of the spreading device 98, for example, in reference to the first axis of rotation D1 and/or the second axis of rotation D2.

A decoupling unit 115 is arranged in the drive train 109, by means of which decoupling unit the drive train 109 can be selectively opened and closed. The decoupling unit 115 has the following purpose: In order to prevent uncontrolled slipping, the spreader arms 100 are used to brace the transport device 104 in the second position with the object 38 to be transported, in particular with a pallet 40 (see FIG. 5). A rotation of the guide vehicle $10_4$ in the braced state, in particular for steering, would then not be possible without further ado, since other-wise the resistances present in the drive train 109 and in the further drive unit 107 would need to be overcome.

Figure 6F:
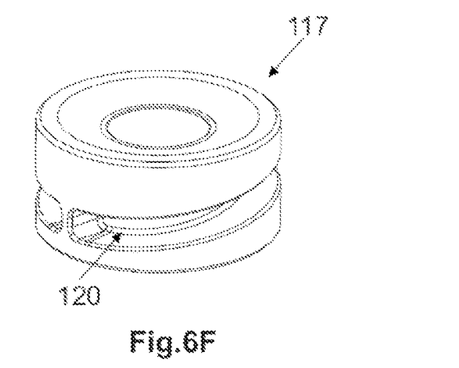
FIG. 6F shows an isolated representation of an actuator of a decoupling unit.

The decoupling unit 115 comprises a cam disc 117, which is separately illustrated in FIG. 6F. The cam disc 117 is connected to an output shaft 124 of the further drive unit 107 in a rotationally fixed but axially displaceable manner. The cam disc 117 has a groove 120 with a helical course and a certain pitch in the lateral surface. A pin 122 anchored in the support structure 12 projects into the groove 120 (FIG. 6E). When the cam disc 117 is rotated by the output shaft 124, in addition to the rotational movement it also performs a translatory movement parallel to the axis of rotation R. The translatory movement of the cam disc 117 is transmitted to a coupling element 126, which is ring-shaped. For this purpose, the coupling element 126 comes into contact with the cam disc 117 via a first end face 128. The coupling element 126 has a first spur gear 132 on a second end face 130, which first spur gear, depending on its position, can engage with a corresponding second spur gear 134 of the second cog 113. In the operating condition shown in FIG. 6E, the first spur gear 132 and the second spur gear 134 are not engaged. When the first spur gear 132 and the second spur gear 134 are engaged, the rotational movement of the output shaft 124 of the further drive unit 107 is transmitted to the first cog 111, whereby the spreading arms 100 are moved. Depending on the direction of rotation of the output shaft 124, the coupling element 126 is moved from the cam disc 117 to or away from the second cog 113. Accordingly, the first spur gear 132 and the second spur gear 134 can be engaged or disengaged. To guarantee the contact between the cam disc 117 and the coupling element 126, the coupling element 126 cooperates with a return spring 136.

If, for example, the spreading arms 100 are moved from the second position to the first position, and the further drive unit 107 is rotated further in this direction after the first position has been reached, this causes a rotation of the support section 39. In this way, the spreading device 98 and consequently the spreading arms 100 can be brought into any rotational position relative to the support structure 12 or the housing 13. The rotational position can be detected with the angle sensor 121. In a similar manner, this applies when the spreading arms have reached the second position.

Figure 7A:
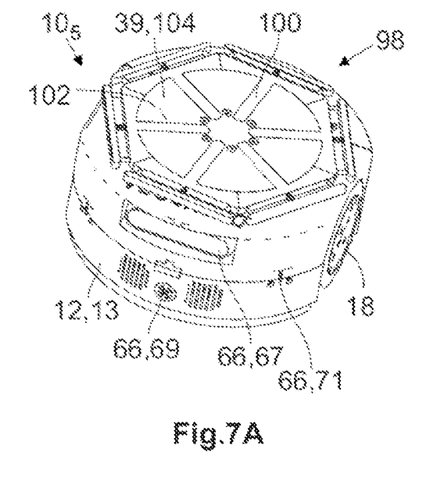
FIG. 7A shows a perspective view of a fourth embodiment example of the guide vehicle according to the invention which has a spreading device.

FIG. 7A uses a perspective representation to show a fifth embodiment example of the guide vehicle $10_5$ according to the invention. The construction of the guide vehicle $10_5$ according to the fifth embodiment example is largely similar to that of the fourth embodiment example of the guide vehicle $10_4$, in particular as regards the construction of the drive trains 109 and the adjustment unit 106.

Figure 7B:
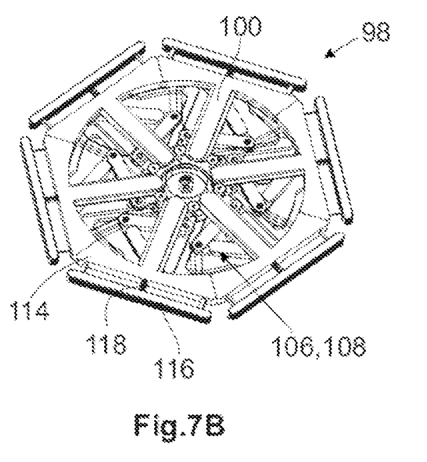
FIG. 7B shows the spreading device of the guide vehicle according to the invention as per the fourth embodiment example in an isolated top view, wherein the spreading device is in a first position.
Figure 7C:
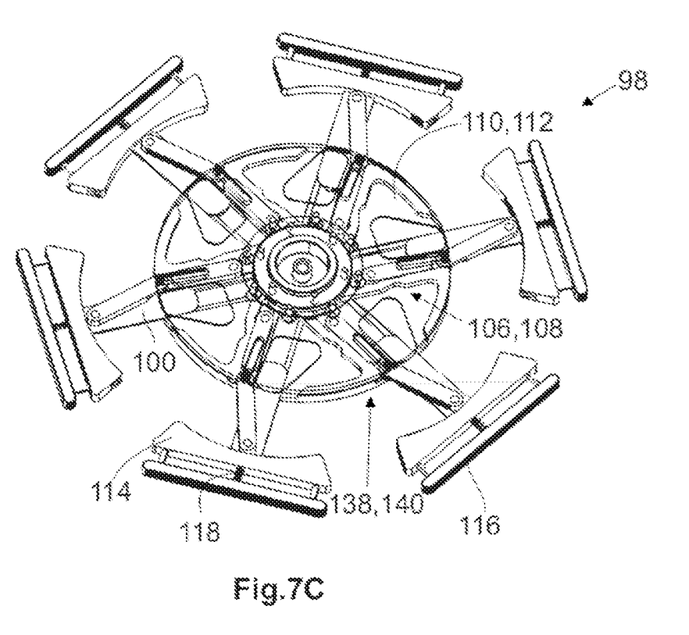
FIG. 7C shows a bottom view of the spreading device represented in FIG. 7B in a second position.

The spreading device 98 comprises a total of six spreading arms 100, which are in a first position in FIG. 7B and in a second position in FIG. 7C. The spreading arms 100 are also found in the first position in FIG. 7A. It can be seen that the spreading arms 100 do not protrude beyond the outer contour 14 of the support structure 12 when the spreading arms 100 are in the first position. As is also the case in the fourth embodiment example of the guide vehicle $10_4$, the spreading arms 100 are slidably mounted in the guide ways 102, wherein the guide ways 102 extend from grooves disposed in the support portion 39 so that the support portion 39 forms a corresponding number of circular sector elements 104 (see FIG. 7A). For illustration reasons, the circular sector elements 104 are not shown in FIG. 7C.

The guide ways 102 extend radially outward from the center of the guide vehicle $10_4$, such that the spreading arms 100 can likewise move in a radial direction, as can be seen from a comparison of FIG. 7B and FIG. 7C. The adjustment unit 106 respectively comprises one toggle lever unit 108 per spreading arm 100, which can be stretched or compressed by rotating a synchronization unit 110, which comprises a slotted disk 112 in the embodiment shown. The spreading arms 100 are moved radially outward into the second position by stretching the toggle lever unit 108 and are moved into the first position by compressing the toggle lever unit 108. Since the sliding plate 112 interacts with all toggle lever units 108 in the same manner, all spreading arms 100 are moved simultaneously when the sliding plate 112 is rotated.

The spreading device 98 comprises a locking device 138, with which the adjustment unit 106 can at least be locked when the spreading arms 100 are in the second position. In the fifth embodiment example of the guide vehicle, the locking device 138 is implemented in the following manner: The sliding plate 112 cooperates with the toggle lever units 108 so that both legs of the toggle lever units 108 are moved beyond an angle of 180° in the second position and, consequently, are pressed over and rest against a stop 140 in the second position. This locks the spreading arms 100 in the second position without there being a need to apply a locking force. This makes it possible to keep the spreading arms 100 in the second position even when the drive train 109 is engaged. In this respect, the locking device 138 is largely formed by the adjustment unit 106 itself, such that no additional elements need to be provided for this purpose. It is, however, alternatively also possible that the locking device 138 comprises one or more movable bolts or the like, with which the adjustment unit 138 can be locked.

Beyond this, a stop element 114 is connected to each radial outer end of the spreading arms 100. As can, in particular, be seen from FIG. 7A and FIG. 7B, stop elements 114 in the first position strike both respective adjacent stop elements 114. Furthermore, the stop elements 114 also strike the circular sector elements 104. This clearly defines the first position of the spreading arms 100.

A support element 116 is movably fastened to each of the stop elements 114, wherein the support elements 116 are pretensioned by means of a spring 118.

As shown, in particular, in FIG. 5, a pallet 40 can, for example, be transported by a total of six guide vehicles 10. If guide vehicles 10₄, 10₅ according to the fourth or fifth embodiment example are used, they are driven into a cavity of the pallet 40 until they are located in the area of the aforementioned cross-piece 82. The spreading device 98 is hereby in the first position.

Once the guide vehicle 10₄, 10₅ has reached the desired position within the cavity, then the lifting mechanism is first activated, whereby the pallet 40 is lifted. Subsequently, the spreading device 98 is activated so that the spreading arms 100 are moved from the first position to the second position. In so doing, the support elements 116 come in contact with the side walls of the cavity of the pallet 40, whereby the guide vehicle 10₄, 10₅ is frictionally connected with the pallet 40. In this process, the springs 118 are compressed, such that impact-like loads are prevented. In addition, the support elements 116 can be floating so that, together with the springs 118, the manufacturing inaccuracies can be compensated for. As a result, the guide vehicle 10₄, 10₅ is aligned in a defined manner with respect to the pallet 40. As a consequence, the pallet 40 can no longer shift in relation to the guide vehicle 10₄, 10₅. Now, the pallet 40 can be moved to the desired destination location by means of the guide vehicle 10₅.

As mentioned, the guide vehicle 10₅ according to the fifth embodiment example differs, in particular, from the guide vehicle 10₄ according to the fourth embodiment example in the number of spreading arms 100. Due to the larger number of spreading arms 100, it is possible to dispense with the use of the angle sensors 121 since the spreading device 98 can align itself in such a way that the spreading arms 100 are largely parallel to the surface of the object 38 with which the guide vehicle 10₄ is to be braced.

Figure 8:
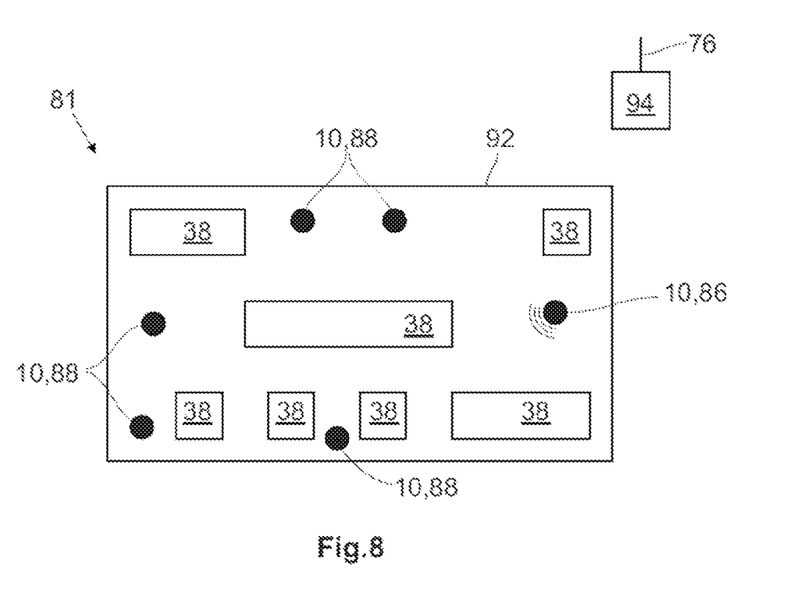
FIG. 8 shows a loading area being loaded with a plurality of objects using a transport system.

FIG. 8 shows a transport system 81 having a total of six guide vehicles 10, which are distributed within a working area 92. Various objects that are to be transported by the transport system 81 are stored in the working area 92. The transport system 81 comprises a control unit 94 with which the guide vehicles 10 can be controlled or regulated. As already mentioned, the guide vehicles 10 are equipped with communication devices 76 (see FIG. 1B) which enable the exchange of information between them. The control unit 94 is also equipped with such a communication device 76, so that not only is an exchange of information between the guide vehicles 10 possible, but rather an information exchange between the guide vehicles 10 and the control unit 94 is also possible. The control unit 94 can, for example, define tasks which are to be performed by the guide vehicles 10, which might, for example, consist in transporting the various objects 38 from one location to the destination location. As mentioned, the guide vehicles 10 are located within a working area 92. The control unit 94 can be located outside the working area 92, however a location within the working area 92 is also possible. The communication device 76 uses a wireless network, for example a WLAN or Bluetooth for exchange of information. Depending on the configuration and the size of the objects, it is however not always guaranteed that the WLAN is necessarily available to a sufficient extent within the entire working area 92. The functionality of the transport system does however depend on a sufficiently available WLAN. In order to stabilize the WLAN-network, it is possible that some or all of the guide vehicles 10 are operated in the manner of repeaters or as a relay station, to guarantee that the WLAN is also available in the corners of the working area 92 or behind or underneath objects. As described in conjunction with FIG. 5, it is possible that one or more of the guide vehicles 10 is operated as a master 86. As also mentioned, the master 86 primarily serves the purpose of capturing the surroundings around the object 38 to be transported, however the master 86 can also be positioned so that the WLAN-network is at least available to the slaves 88 associated with it.

Figure 9:
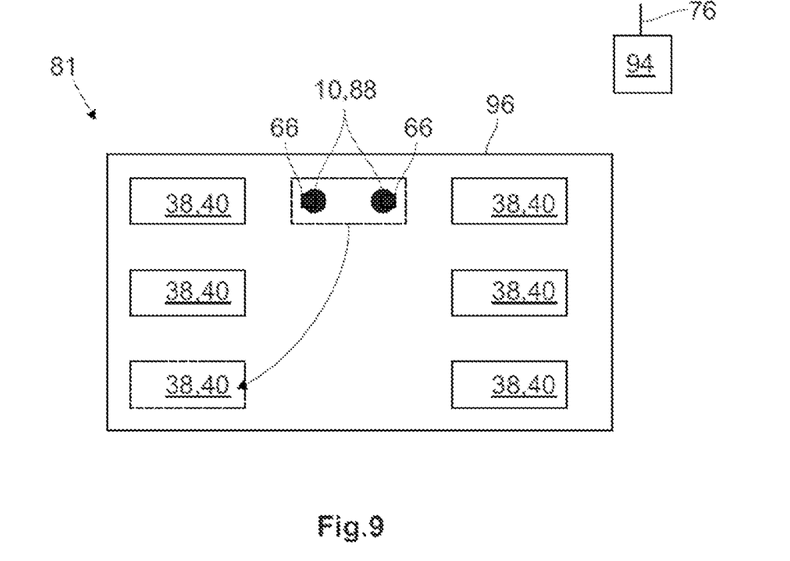
FIG. 9 shows a working area in which a transport system is used.

FIG. 9 shows a loading area 96, for example that of a truck, which is loaded by the transport system 81 according to the invention. Due to the fact that the force acting on the support portion 39 of at least one guide vehicle 10, according to one of the previously described embodiment examples, can de detected by means of the force measuring device 56, said information can also be used to guarantee that the loading area 96 of the truck is loaded in the most uniform manner possible. In the example illustrated in FIG. 9, the loading area 96 is to be loaded with a total of six pallets 40, all of which should weigh the same, however the transport system 81 cannot initially assume as much. The transport system 81 firstly places a total of three pallets 40 into a first row next to each other and records the precise positions and the weight of the respective pallets 40 that are on the loading area 96. Subsequently, the guide vehicle 10₁ transports a fourth pallet 40 into a second row and lastly a fifth and a sixth pallet 40 into a third row. After the sixth and last pallet 40 has also been transported onto the loading area 96, the transport system 81 receives the information that no additional pallets 40 need to be loaded onto the loading area 96. The transport system 81 detects that there is an uneven loading of the loading area 96. The transport system 81 modifies the position of the fourth loading area 96 in such a way that the loading area 96 is now evenly loaded. The position of the fourth loading area 96 is modified as indicated with the arrow.

As mentioned, the guide vehicles 10 respectively include a signal generator 64 (see FIG. 1B). The signal generator 64 can output an indication signal when the pallets 40 are heavy enough to exceed the maximum load of the respective guide vehicles 10. It can be detected when the maximum has been exceeded using the force measuring device 56.

Furthermore, it can be seen from FIG. 9 that the sensor units 66 of the guide vehicles 10 are oriented in opposing directions. One of the guide vehicles 10 thereby captures the surroundings on the one side of the pallet 40, while the other guide vehicles 10 capture the surroundings on the other side of the pallet 40.

REFERENCE LIST

- 10 guide vehicle
- 10₁-10₅ guide vehicle
- 12 support structure
- 13 housing
- 14 outer contour
- 16 chassis
- 18 first wheel
- 20 second wheel
- 22 drive unit
- 24 first drive motor
- 26 second drive motor
- 28 first gear
- 30 second gear
- 32 lifting mechanism
- 34 spindle nut
- 36 third drive motor
- 37 spindle
- 38 object
- 39 support portion
- 40 pallet
- 42 plate
- 44 nop mat
- 46 adapter sleeve
- 48 plate housing
- 50 O-Ring
- 52 axial roller bearing
- 54 rubber ring
- 56 force measuring device
- 58 force sensors
- 60 first group
- 62 second group
- 63 evaluation unit
- 64 signal generator
- 66 sensor unit
- 67 camera
- 68 sensor section
- 69 ultrasonic sensor
- 70 energy store
- 71 laser-based sensor
- 72 bristle portion
- 74 self-stabilizing device
- 76 communication device
- 78 carrying handle
- 80 groove
- 81 transport system
- 82 cross-piece
- 84 plank
- 86 master
- 88 slave
- 90 master sensor unit
- 92 working area
- 94 control unit
- 96 loading area
- 98 spreading device
- 100 spreading arm
- 102 guide way
- 104 circular sector element
- 106 adjustment unit
- 107 further drive unit
- 108 toggle lever unit
- 109 drive train
- 110 synchronization unit
- 111 first cog
- 112 sliding plate
- 113 second cog
- 114 stop element
- 115 decoupling unit
- 116 support element
- 117 cam disc
- 118 spring
- 119 bearing unit
- 120 groove
- 121 angle sensor
- 122 pin
- 124 output shaft
- 126 coupling element
- 128 first end surface
- 130 second end surface
- 132 first spur gear
- 134 second spur gear
- 136 return spring
- 138 locking device
- 140 stop
- AP plane outer surface
- AW curved outer surface
- D common axis of rotation
- D1 first axis of rotation
- D2 second axis of rotation
- R rotational axis

The invention claimed is:

1. An automated guide vehicle (10) for transporting objects (38) comprising
    a support structure (12) with an outer contour (14), wherein the outer contour (14) of the support structure (12) is substantially rotationally symmetrical around a rotational axis (R),
    a chassis (16) fastened to the support structure (12) having at least one first wheel (18) and one second wheel (20), wherein the first wheel (18) and the second wheel (20) are respectively rotatably mounted in the chassis (16) about a first axis of rotation (D1) and a second axis of rotation (D2),
    a drive unit (22) with which the first wheel (18) and the second wheel (20) can be driven independently one from the other, and
    an energy store (70) for electrical energy, which in plan view protrudes in portions beyond the outer contour (14) of the support structure (12), wherein the energy store (70) is movably fastened to the support structure (12),
    wherein the energy store (70) is rotatably fastened to the support structure (12) about the rotational axis (R), wherein the rotational axis (R) runs perpendicular to the first axis of rotation (D1) or the second axis of rotation (D2) and vertically.

2. The automated guide vehicle (10) according to claim 1, wherein the energy store (70) is detachably fastened to the support structure (12).

3. The automated guide vehicle (10) according to claim 1, wherein the automated guide vehicle (10) comprises a lifting mechanism (32) cooperating with the support structure (12) for lifting and lowering at least one support portion (39) which cooperates therewith to transport the objects.

4. The automated guide vehicle (10) according to claim 1, wherein
the outer contour (14) of the support structure (12) is substantially rotationally symmetrical about a rotational axis (R) in plan view, and
the support portion (39) and/or the first wheel (18) and the second wheel (20) are arranged within the outer contour (14) or are flush with the outer contour (14).

5. The automated guide vehicle (10) according to claim 1, wherein
the automated guide vehicle (10) comprises a sensor unit (66) for capturing the surroundings of the guide vehicle (10), wherein
the sensor unit (66) is arranged in a sensor section (68) that is delimited by the outer contour (14) and the first axis of rotation (D1) or the second axis of rotation (D2), and
the sensor unit (66) is configured in such a way that it only captures the part of the surroundings on the side of the first axis of rotation (D1) or of the second axis of rotation (D2), on which the sensor unit (66) is arranged.

6. The automated guide vehicle (10) according to claim 4, wherein the energy store (70) is arranged outside the sensor section (68).

7. The automated guide vehicle (10) according to claim 1, wherein the automated guide vehicle (10) comprises at least one support wheel and/or one bristle portion (72).

8. The automated guide vehicle (10) according to claim 1, wherein all wheels (18, 20) are rotatably arranged around a common axis of rotation (D) and the automated guide vehicle (10) comprises a self-stabilizing device (74).

9. The automated guide vehicle (10) according to claim 1, wherein the automated guide vehicle (10) comprises a signal generator (64) for output of an indication signal.

10. The automated guide vehicle (10) according to claim 1, wherein the automated guide vehicle (10) comprises a carrying handle (78) for gripping the guide vehicle (10).

11. An automated transport system (81), comprising
a plurality of automated guide vehicles (10) according to claim 1,
a control unit (94) for controlling or regulating the automated guide vehicles (10), and
a communication device (76) with which information can be exchanged between the control unit (94) and the automated guide vehicles (10).

12. The automated transport system (81) according to claim 10, wherein
one of the automated guide vehicles (10) is set up as a master (86) and the remaining automated guide vehicles (10) are set up as slaves (88),
the master (86) comprises a master sensor unit (90) for capturing the surroundings of the master (86), and
the master (86) transmits information relating to the surroundings of the master (86) to the control unit (94) and/or to the slaves (88).

13. The automated transport system (81) according to claim 10, wherein
each of the guide automated vehicles (10) respectively comprises a sensor unit (66) for capturing the surroundings of the guide vehicle (10), wherein
the sensor unit (66) is arranged in a sensor section (68) that is delimited by the outer contour (14) and the first axis of rotation (D1) or the second axis of rotation (D2), and
the sensor unit (66) is designed to only capture the portion of the surroundings on the side of the first axis of rotation (D1) or of the second axis of rotation (D2), on which the sensor unit (66) is arranged, wherein
at least a first of the sensor units is oriented in a first direction and at least a second of the sensor units is oriented in a second direction.

* * * * *